Dec. 11, 1962   H. H. KOPPEL   3,068,387
MANUAL AND AUTOMATIC CONTROL SERVO-SYSTEM
Original Filed Sept. 21, 1959   5 Sheets-Sheet 1

FIG. 1

INVENTOR.
HAROLD H. KOPPEL
BY
*John F. Lahne*
ATTORNEY

FIG. 2

INVENTOR.
HAROLD H. KOPPEL
BY
ATTORNEY

Dec. 11, 1962     H. H. KOPPEL     3,068,387
MANUAL AND AUTOMATIC CONTROL SERVO-SYSTEM
Original Filed Sept. 21, 1959     5 Sheets-Sheet 3

FIG. 3

INVENTOR.
HAROLD H. KOPPEL
BY
John F. Luhrs
ATTORNEY

Dec. 11, 1962 H. H. KOPPEL 3,068,387
MANUAL AND AUTOMATIC CONTROL SERVO-SYSTEM
Original Filed Sept. 21, 1959 5 Sheets-Sheet 4

FIG. 4

INVENTOR.
HAROLD H. KOPPEL
BY
*John F. Luhrs*
ATTORNEY

Dec. 11, 1962 H. H. KOPPEL 3,068,387
MANUAL AND AUTOMATIC CONTROL SERVO-SYSTEM
Original Filed Sept. 21, 1959 5 Sheets-Sheet 5

INVENTOR.
HAROLD H. KOPPEL
BY
*John F. Labera*
ATTORNEY

United States Patent Office 3,068,387
Patented Dec. 11, 1962

3,068,387
MANUAL AND AUTOMATIC CONTROL SERVO-SYSTEM
Harold H. Koppel, South Euclid, Ohio, assignor to Bailey Meter Company, a corporation of Delaware
Continuation of application Ser. No. 841,171, Sept. 21, 1959. This application June 5, 1961, Ser. No. 116,238
19 Claims. (Cl. 318—28)

This invention relates to control apparatus and more particularly to apparatus for transferring control of a variable from one method of control to another.

The alternate use of two or more methods of control in a control system is well known to those skilled in the art. For example, a provision for alternate use of two different servo mechanisms is often desired so that in the event of failure of one mechanism a reserve mechanism will be available to maintain the control system in operation. Another example of the alternate use of two different methods of control is in a control system where provision is made for both automatic control and manual control. At times it is desired to operate the control system manually and a transfer from automatic to manual control is made through the provision of a suitable transfer or selector station.

One major problem in the transfer of control from one mechanism to another is the fact that inequality of the outputs of the automatic controller and manual controller at the instant of transfer will produce a shock or bump which may result in instability or damage to the system. In the past this condition has been avoided through manual adjustment of the manual controller output or system setpoint to equalize the two controller outputs prior to transfer. Such a manual adjustment, however, is objectionable due to the fact that it is time-consuming and in some cases difficult to accomplish such as in a control system having reset action.

It is a principal object of this invention to effect an automatic transfer of the control of a variable from one mechanism to another and vice versa without manual adjustment of the output of either mechanism prior to transfer.

Another object of the invention is to automatically equalize the outputs of two controllers prior to transfer of control from one controller to the other or vice versa.

Another object of the invention is to provide an improved automatic transfer selector station for transferring control of a variable from one mechanism to another.

Other objects and advantages will become apparent from the following description taken in connection with the accompanying drawings wherein.

Figure 1:
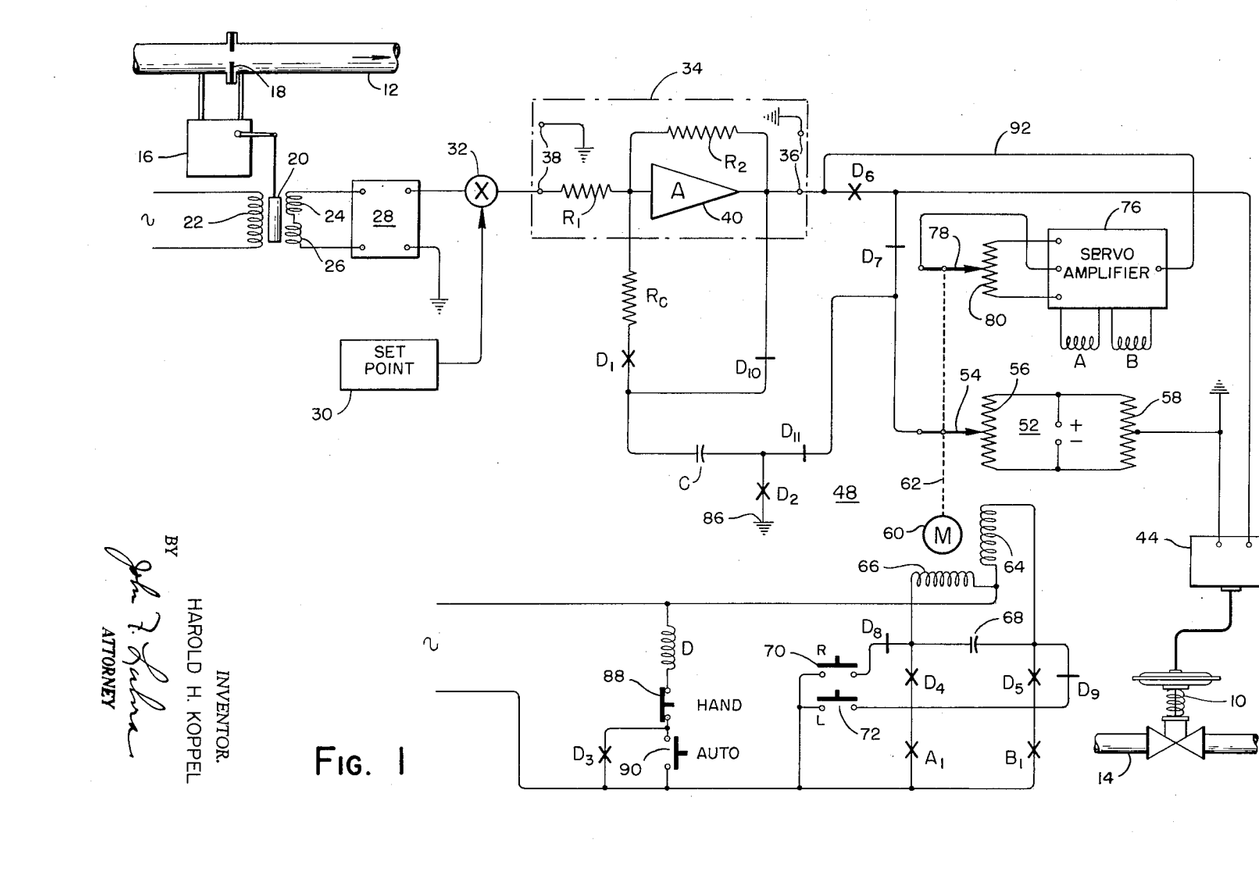
FIG. 1 is a schematic illustration of the application of the invention to a control system.

*FIG. 1 Embodiment*

Referring more particularly to FIG. 1 of the drawings, there is shown a single element control system comprising a final control element or valve 10 which is actuated pneumatically in accordance with the flow rate in a conduit 12 to control the flow rate of fluid in a conduit 14. A transmitting device 16 is responsive to the flow rate of fluid in conduit 12 as is represented by the differential pressure across a primary measuring element 18, and is effective to actuate the movable core 20 of a movable core transformer having a primary winding 22 and a pair of serially connected, oppositely wound secondary windings 24 and 26. The primary winding 22 is connected across a suitable source of alternating voltage as indicated schematically while the secondary windings 24 and 26 are coupled to a demodulator 28. With this arrangement a modulated signal is supplied to the input of the demodulator 28 with a carrier frequency corresponding to the frequency of the A.-C. source, the modulated amplitude of the signal being proportional to the flow rate of the fluid in conduit 12. Circuitry of this nature is well known to those skilled in the art, and therefore, further description is deemed unnecessary.

The demodulator 28 is effective to remove the A.-C. carrier signal to establish a variable D.-C. signal at its output terminals proportional to the flow rate in conduit 12. The transmitting device 16 and demodulator 28 may be calibrated to produce any desired range and level of direct voltage at the output terminals of demodulator 28 in the range of flow rates encountered. However, as disclosed in Hornfeck et al. application Serial No. 805,019, this direct voltage signal may be caused to vary in the range of −25 to +25 volts.

The output of demodulator 28 is compared with the output of a manually adjustable circuit 30 at a summing junction indicated schematically at 32 to establish an error signal representative of the variation of the flow rate from "set point". The output of the circuit 30 is manually adjustable in the range of −25 to +25 volts to provide a "set point" voltage with which the output of demodulator 28 is compared algebraically.

The error signal thus established at the summing junction 32 is impressed on the input terminals of an automatic controller 34 which may be composed of one or more plug-in control action units of the type disclosed in Hornfeck et al. application Serial No. 805,019. The controller 34 illustrated in FIG. 1 comprises a single plug-in control action unit having proportional action for producing an output signal at terminal 36 proportional to the error signal applied to the input terminals 38.

In general the controller 34 comprises a high gain, low output impedance D.-C. amplifier 40 having a passive input resistor $R_1$ and a passive feedback resistor $R_2$. As described in the aforementioned copending application Serial No. 805,019, the gain of the controller 34 is determined by the relative sizes of resistors $R_1$ and $R_2$.

As will later be described in more detail, during automatic operation of the system the output of the controller 34 is applied directly to an electric to pneumatic converter 44 which is effective to establish a proportional pneumatic signal for application to the valve 10. Such converting devices are well known to those skilled in the art, and a detailed disclosure and description of this component is deemed unnecessary.

During manual operation of the system, however, the controller 34 is disconnected from the converter 44 and an electrical signal is established manually and applied to the converter 44. As a result the valve 10 is positioned independently of the controller 34 output and independently of variations in the flow rate in conduit 12.

A manual-automatic selector station 48 is provided for transferring control of the valve 10 from the controller 34 to a manually operative controller which includes a potentiometer circuit 52 energized by a suitable source of direct voltage and having a movable contact arm 54 the potential of which depends on its position relative to a slidewire 56. The potentiometer circuit 52 is completed by a second resistor 58 having a grounded center tap connected to an input terminal of the converter 44. With this arrangement the voltage of contact arm 54 will be the manual control voltage.

The movable contact arm 54 is adapted to be connected by switch means later to be described to the other input terminal of the converter 44 and is positioned by an electric motor 60 acting through linkage 62. The motor 60 is provided with the usual energizing windings 64 and 66 which are connected in an electric circuit with a capacitor 68 across a suitable source of alternating voltage. Energization of the windings 64 and 66 is controlled during manual operation by a pair of manually operative pushbutton switches 70 and 72. Switch 70 is effective when closed depending upon the condition of other parts later to be described to connect the energizing winding 66 directly across the A.-C. source and to connect the energizing winding 64 in series with the capacitor 68 across the same source. As a result a 90° phase relationship will be established between the two windings causing the motor 60 to rotate in one direction. If switch 70 is open and switch 72 closed this phase relationship will be reversed causing rotation of the motor in the opposite direction. Thus, closure of the appropriate switch 70 or 72 will effect manual positioning of the valve 10 in the desired direction.

As previously mentioned it is necessary that the outputs of two alternate control mechanisms be equal at the instant of transfer of control to avoid introducing a shock or bump into the system. With the present invention this is accomplished automatically as will now be described.

Referring first to a transfer from automatic operation to manual operation, means are provided for effecting continuous positioning of the contact arm 54 in accordance with the output of controller 34 during automatic operation so that any instant during automatic operation the potential of contact arm 54 will equal the output potential of controller 34 and a transfer may be safely made. This means comprises a servo amplifier 76, which may take various forms well known to those skilled in the art, effective to control energization of a pair of relays A and B having normally open contacts $A_1$ and $B_1$ respectively. The contacts $A_1$ and $B_1$ are connected in shunt circuits with the switches 70 and 72 respectively, and thus energization of the relays A and B will effect rotation of the motor 60 and positioning of the contact arm 54 in opposite directions.

The motor 60 is also effective to position a contact arm 78 relative to a slidewire resistance 80 connected across a voltage source (not shown) forming part of amplifier 76 to establish a voltage feedback signal in servo amplifier 76 equal to the potential at contact arm 78 and the manual control voltage at contact arm 54. This voltage is continuously compared with the output potential of controller 34 in the servo amplifier 76 during automatic operation. The relays A and B are energized in accordance with the polarity of the voltage difference to effect rotation of the motor 10 in a direction to maintain the two voltages equal. Thus, through selective energization of the relays A and B continuous follow-up positioning of the contact arm 54 will occur to maintain the manual control voltage equal to the output of the controller 34 during automatic operation.

During manual operation of the system, positioning of the contact arm 54 from servo amplifier 76 is discontinued and the energizing circuit for windings 64 and 66 is conditioned to transfer control of the motor 60 to manually operative switches 70 and 72. The operator by opening and closing the switches 70 and 72 may then exercise manual control over the position of the valve 10 as hereinbefore described.

Since during manual operation the contact arm 54 is positioned independently of the controller 34 output separate means including a capacitor C is provided for equalizing the two voltages at the instant of transfer back to automatic operation. An understanding of the operation of this means will be facilitated by the accompanying mathematical analysis of the various circuit conditions at the instant of transfer.

The output $e_0$ of the controller 34 during both automatic or manual operation may be expressed as follows:

$$e_0 = -Ke_{in} \qquad (1)$$

wherein $e_{in}$ is the error or input signal applied to the controller 34 and K is the overall gain of the controller 34 as determined by the relative magnitudes of the resistors $R_1$ and $R_2$.

At the instant of transfer it is desirable that the following relationship be established:

$$e_0 = e_m \qquad (2)$$

where $e_m$ is the manual control voltage on contact arm 54 and manually determined by the operator through actuation of switches 70 and 72.

To accomplish this condition the capacitor C is connected by switch means later to be described between the contact arm 54 and the output terminal 36 of the controller 34. With this arrangement the voltage $e_c$ of the capacitor C may be expressed mathematically as follows:

$$e_c = -(e_m + Ke_{in}) \qquad (3)$$

As the transfer is made the switch means is effective to simultaneously connect one side of the capacitor C to the input terminal of the amplifier 40 through an input resistor $R_c$ equal in size to the resistor $R_2$ and the other side of the capacitor to ground at 86. At this instant the controller 34 output $e_0$ will be equal to:

$$e_0 = -Ke_{in} - e_c \qquad (4)$$

Through substitution in Equation 4 for $e_c$ the following equation results:

$$e_0 = -Ke_{in} + (e_m + Ke_{in}) \qquad (5)$$

and $$e_0 = e_m \qquad (6)$$

Thus, at the instant of transfer the controller 34 output $e_0$ will equal the manual control voltage $e_m$ resulting in a smooth bumpless transfer back to automatic operation. From this instant on the capacitor C will discharge through the resistor $R_c$ until the charge on the capacitor C is zero.

Since the resistors $R_c$ and $R_2$ are equal in size the term $e_c$ in equation 4 appears at the output of the controller 34 without a gain factor K. Thus, when the capacitor C has discharged completely the resistor $r_c$ and capacitor C will be completely ineffective in the circuit and normal automatic operation will exist wherein the controller output $e_0$ will be again equal to $Ke_{in}$. It will be apparent to those skilled in the art that the discharge time of the capacitor C may be varied through proper sizing of this element.

In effect the addition of the capacitor C and resistor $R_c$ to the proportional control action unit 34 produces a summing control action unit of the type disclosed in copending application Serial No. 805,019, this summing unit existing only at the instant of transfer from manual to automatic operation to effect equalization of the controller 34 output voltage and the manual control voltage as described above.

Referring now to the switching means for initiating and effecting the hereinbefore described operations, a relay coil D is connected in series with a pair of pushbutton switches 88 and 90 across the A.-C. energizing source for the system. The switch 88 indicated as "Hand" is biased to a normally closed position and adapted to be actuated to an open position by the operator to effect a transfer from automatic to manual operation. The switch 90 indicated by "Auto" is biased to a normally open position and is adapted to be actuated to a closed position by the operator to initiate a transfer from manual to automatic operation.

The relay coil D is provided with a plurality of contacts $D_1$, $D_2$, $D_3$, $D_4$, $D_5$, and $D_6$ which are biased to their open positions assumed during deenergization of the relay coil D. Similarly, the relay D is provided with a plurality of contacts $D_7$, $D_8$, $D_9$, $D_{10}$ and $D_{11}$ which are biased to closed positions assumed during deenergization of the relay D. It is believed that the function and operation of the pushbutton switches 88 and 90 and relay D will become apparent from the following summary of the operation of the system illustrated in FIG. 1.

Assume that at startup the operator momentarily actuates the switch 90 to a closed position to effect automatic operation of the system. Closure of switch 90 will complete an energizing circuit for relay coil D to effect opening of contacts $D_7$, $D_8$, $D_9$, $D_{10}$ and $D_{11}$ and closure of contacts $D_1$, $D_2$, $D_3$, $D_4$, $D_5$ and $D_6$. Contacts $D_3$ are connected in a shunt holding circuit around the switch 90 and will maintain energization of the relay D when the switch 90 is subsequently released to its open position by the operator. The system is now conditioned for automatic operation.

As a result of energization of relay D the output voltage $e_0$ of the controller 34 is applied directly to the converter 44 through contacts $D_6$ while application of the manual control voltage $e_m$ to the converter is prevented by open contacts $D_7$. The output $e_0$ of the controller 34, however, is applied by conductor 92 directly to the servo amplifier 76 to effect follow-up positioning of the contact arm 54. Contacts $D_4$ and $D_5$ connected in series with contacts $A_1$ and $B_1$ respectively close to permit energization of windings 66 and 64 in response to closure of contacts $A_1$ and $B_1$ respectively as a result of operation of the servo amplifier 76. Contacts $D_8$ and $D_9$ connected in series with the switches 70 and 72 respectively are open during automatic operation to prevent energization of the motor windings as a result of accidental actuation of the switches 70 and 72.

During automatic operation contacts $D_1$, $D_2$ are closed and contacts $D_{10}$, $D_{11}$ are opened to prevent charging of the capacitor C and to render the same ineffective in the controller 34 circuit. As a result of the circuit conditions thus established, the valve 10 will be continuously positioned from the output of controller 34 which is proportional to the flow rate in conduit 12. In addition, the servo amplifier 76 is responsive to the output signal of the controller 34 to continuously effect follow-up movement of the contact arm 54 to maintain the potential of contact arm 54 equal to the controller 34 output voltage. Thus, at any instant during automatic operation the manual control voltage at contact arm 54 is equal to the output of controller 34.

Assume now that the operator desires to operate the valve 10 manually. To accomplish this the "manual" switch 88 is momentarily actuated to an open position to break the energizing circuit for the relay D, deenergizing the same. As a result contacts $D_6$ will open disconnecting the controller 34 output from the converter 44 and contacts $D_7$ will close to connect the contact arm 54 and apply the manual control voltage to the converter 44. Contacts $D_4$ and $D_5$ will open and the contacts $D_8$ and $D_9$ will close to transfer control of energization of the windings of motor 60 to the switches 70 and 72 which may be selectively actuated by the operator to effect positioning of the valve 10.

In addition, contacts $D_1$ and $D_2$ open upon deenergization of relay D and contacts $D_{10}$, $D_{11}$ close to connect the capacitor C between the output terminal 36 of the controller 34 and the contact arm 54. As a result a charge is developed across the capacitor C equal to the algebraic sum of the output voltage $e_0$ of the controller 34 and the manual control voltage $e_m$ as illustrated by Equation 3.

When it is desired to return the system to automatic operation the operator momentarily closes switch 90 to effect reenergization of relay D and reestablishment of the holding circuit through contacts $D_3$. Contacts $D_6$ will close and contacts $D_7$ will open to apply the controller 34 output to converter 44, while contacts $D_4$, $D_5$, $D_8$, $D_9$ will be actuated to transfer control of energization of the motor 60 to contacts $A_1$ and $B_1$.

Conacts $D_{10}$, $D_{11}$ will open while contacts $D_1$ and $D_2$ will close to connect the capacitor C in series with the resistor $R_c$ between the amplifier input terminal and ground at 86. Thus, at the instant of transfer the output voltage $e_0$ of controller 34 is expressed by Equations 5 and 6 and equal to the manual control voltage $e_m$. As a result a bumpless transfer from manual back to automatic operation is achieved. In a very short period of time the capacitor C will discharge completely and become ineffective in the system during the automatic positioning of valve 10.

Figure 2:
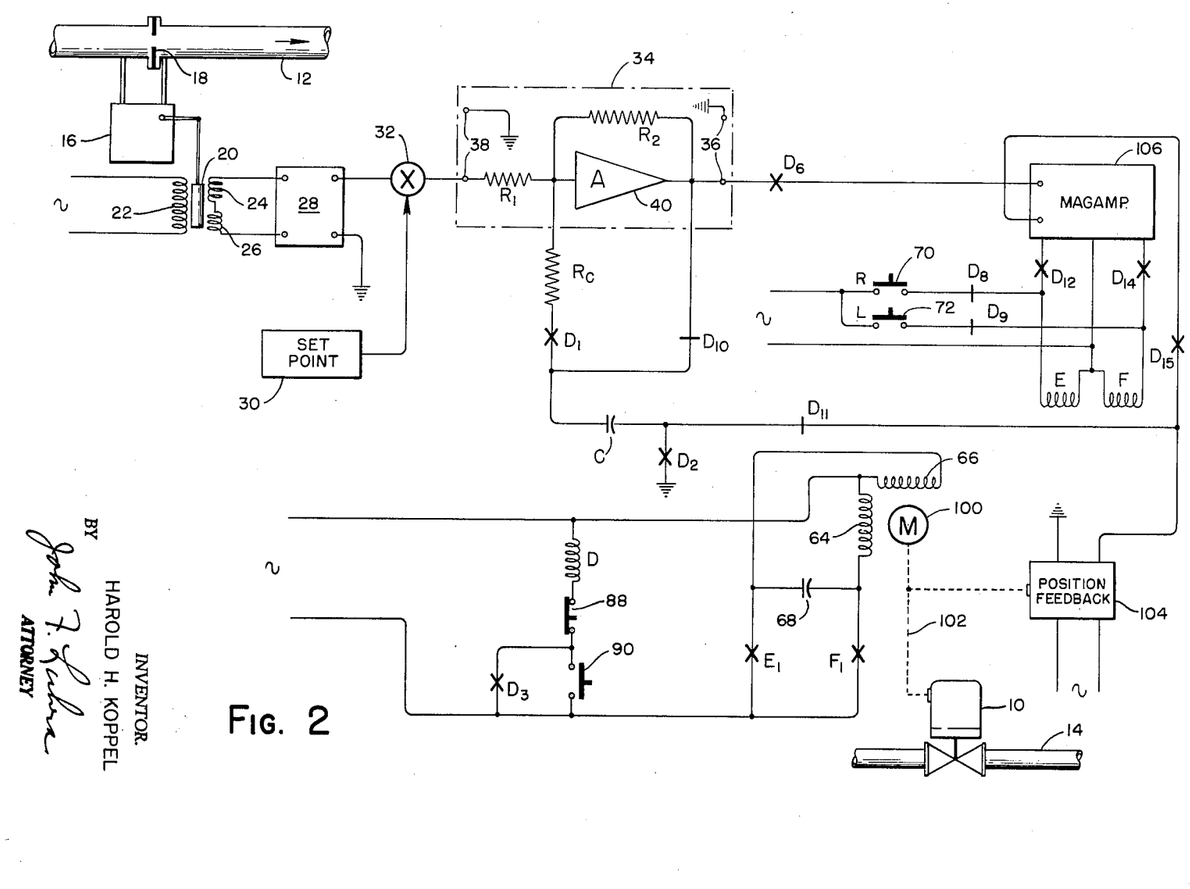
FIGS. 2, 3, 4 and 5 are views similar to FIG. 1 illustrating other embodiments of the invention.

FIG. 2 Embodiment

Referring now to FIG. 2 of the drawings there is shown a control system having a proportional control action unit generally similar to that shown in FIG. 1 but utilizing an electric motor actuated valve positioning system in place of the pneumatic system illustrated in FIG. 1. Parts similar in function to those shown in FIG. 1 have been given like reference numerals.

In general the operation of the embodiment of FIG. 2 is similar to that of FIG. 1 with the exception that in transferring from automatic to manual operation the drive is merely deenergized and then reenergized manually as desired to effect positioning of the valve 10. Therefore, the problem of equalizing two controller outputs does not exist in transferring from automatic to manual operation.

Referring now to the specific structure disclosed in FIG. 2, the valve 10 in this case is positioned directly by electric motor 100 through a linkage 102. The motor 100 is provided with energizing windings 64 and 66 similar to the motor 60 in FIG. 1. A position feedback transmitter 104 is also actuated by the motor 100 and serves to establish a direct voltage signal at its output terminals proportional to the position of valve 10. The output terminal 36 of the controller 34 is adapted to be connected by contacts $D_6$ during automatic operation to one side of an input winding (not shown) of a magnetic amplifier 106. The output of the position feedback transmitter 104 is applied to the other side of this input winding during automatic operation by contacts $D_{15}$ to establish an input to the amplifier 106 proportional to the voltage difference. Relay coils E and F are adapted to be alternately energized by the amplifier 106 during automatic operation according to the polarity of the voltage error or difference signal applied to the magnetic amplifier 106. Accordingly, the amplifier 106 will effect rotation of the motor 100 during automatic operation to maintain the output voltage of transmitter 104 equal to the output voltage of controller 34. Thus, the positioning system comprises a closed loop voltage balance servo system. For a more complete description of the structure and operation of such a voltage balance positioning system reference is made to copending application Serial No. 786,820 filed on January 14, 1959, by Anthony J. Hornfeck et al., now Patent No. 3,015,768.

In the system of FIG. 2 the output of position feedback transmitter 104 is equivalent to the output of potentiometer circuit 52 of FIG. 1, it being necessary to also equalize the outputs of transmitters 104 and controller 34 prior to a transfer from manual to automatic operation. Thus, the contacts $D_{11}$ are effective during manual operation to connect the output of transmitter 104 to one side of capacitor C.

A pair of normally open contacts $D_{12}$ and $D_{14}$ of relay D are connected in series with the relay coils E and F respectively to prevent energization of the relay coils E and F by the magnetic amplifier 106 during manual operation. Manually operative switches 70 and 72 are in this case connected in series with contacts $D_8$ and $D_9$ to control energization of the coils E and F and effect manual positioning of valve 10. Contacts $D_8$ and $D_9$ are open during automatic operation to render switches 70 and 72 inoperative in the system.

The operation of the system illustrated in FIG. 2 is generally similar to the operation of the system illustrated in FIG. 1. To effect automatic operation of the system at startup the switch 90 is momentarily closed by the operator to effect energization of relay coil D which remains energized through its holding contacts $D_3$. Contacts $D_6$ and $D_{15}$ close to apply the outputs of controller 34 and transmitter 104 to the magnetic amplifier 106, and switch $D_{11}$ opens to prevent charging of the capacitor C by the output of transmitter 104. Contacts $D_{12}$ and $D_{14}$ will close while contacts $D_8$ and $D_9$ will open to cause the magnetic amplifier 106 to control energization of windings E and F and positioning of valve 10. With these circuit conditions $E_0$ will equal $Ke_{in}$ as stated in Equation 1.

When it is desired to operate or position the valve 10 manually the operator opens switch 38 to break the holding circuit through contacts $D_3$ and effect deenergization of relay D. As a result contacts $D_6$ and $D_{15}$ will open disconnecting the controller 34 and transmitter 104 from the amplifier 106. Contacts $D_{12}$ and $D_{14}$ will open and the motor will be deenergized. Closure of contacts $D_8$ and $D_9$ will enable the operator to effect manual positioning of the valve 10 through actuation of switches 70 and 72.

The contacts $D_1$, $D_2$, $D_{10}$ and $D_{11}$ are effective during manual operation to connect the capacitor C between the output terminal 36 of controller 34 and output of transmitter 104. Thus, similar to the embodiment of FIG. 1 the charge $e_c$ on the capacitor C may be expressed by Equation 3. In this case, however, $E_m$ will be the output voltage of transmitter 104 which will be equal to the controller 34 output voltage at the instant of transfer. Thus, when the switch 90 is subsequently actuated by the operator to transfer back to automatic operation, a smooth, bumpless instantaneous transfer will be achieved similar to the embodiment illustrated in FIG. 1.

Figure 3:
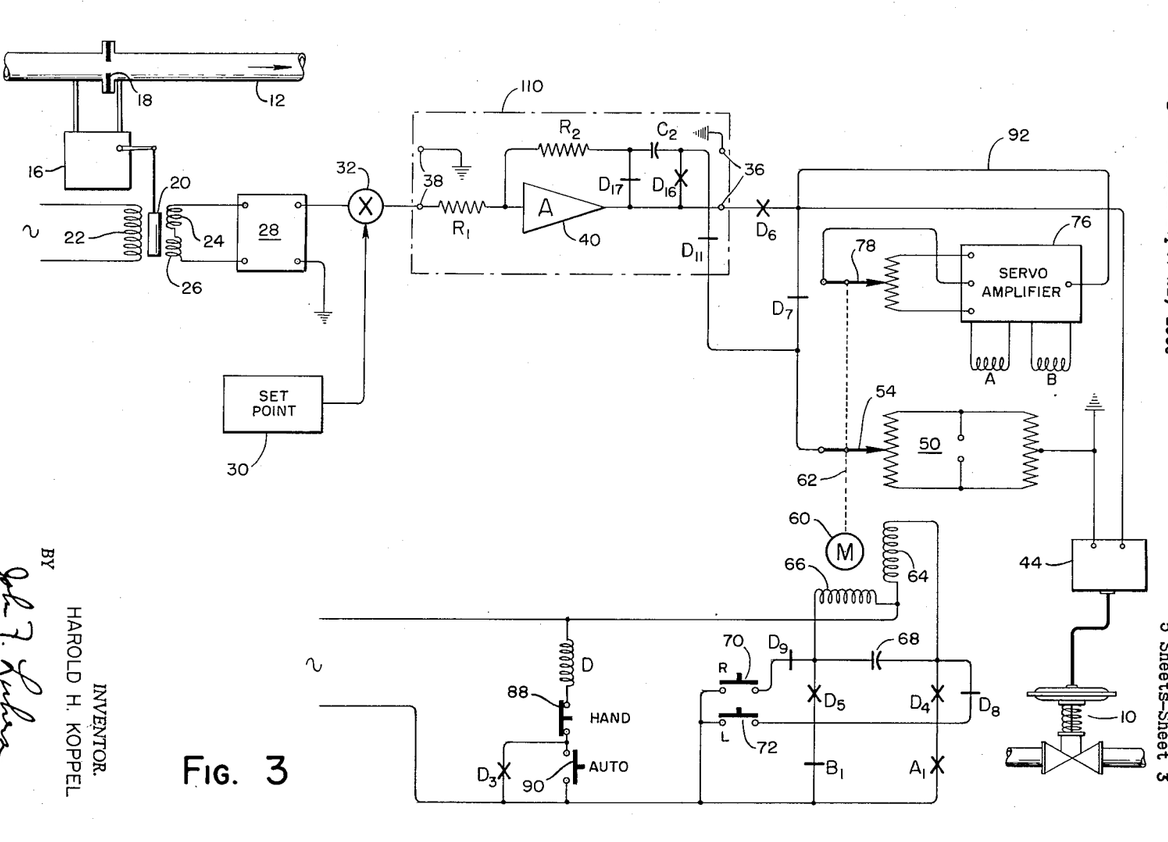

*FIG. 3 Embodiment*

Referring to FIG. 3 of the drawings there is shown an automatic transfer selector station similar to that disclosed in FIG. 1 but adapted for use with a controller 110 having reset action in addition to proportional action. As disclosed in more detail in copending application Serial No. 805,019 such a controller comprises input and feedback resistors $R_1$ and $R_2$ and in addition a capacitor $C_2$ which is connected in series with the resistor $R_2$ in the feedback circuit to provide the reset or integrating action.

With the controller of FIG. 3 the reset capacitor $C_2$ is employed to equalize the output of the controller 110 with the manual control voltage at the instant of transfer from manual to automatic operation in the same manner as capacitor C of FIG. 1. Thus, the capacitor $C_2$ serves two functions, that of providing reset action and that of effecting equalization of the controller 110 output voltage at the instant of transfer.

The relay coil D in this case is provided with contacts $D_{16}$ which close during automatic operation to complete the feedback circuit through resistor $R_2$ and capacitor $C_2$. As in the case of the FIG. 1 embodiment the output terminal 36 is connected during automatic operation by contacts $D_6$ to the converter 44. Also, the controller 110 output is applied through conductor 92 during automatic operation to the servo amplifier 76 to effect continuous followup movement of the contact arm 54 as described in connection with FIG. 1.

The system is transferred to manual operation similar to the embodiment illustrated in FIG. 1. In this case, however, deenergization of relay coil D at the instant of transfer is effective to close contacts $D_{11}$ to connect the right hand side of the capacitor $C_2$ to the contact arm 54. In addition, contacts $D_{17}$ close simultaneously to connect the resistor $R_2$ directly to the output terminal 36 causing the controller 110 to become a proportional controller. With this circuit arrangement if the gain of the controller 110 is K the output $e_0$ will be equal to $Ke_{in}$. Thus, during manual operation the output voltage of the controller 110 will continuously equal the input voltage and the reset action will be removed from the controller.

It will be apparent that during manual operation the controller 110 output $e_0$ will equal $Ke_{in}$ if the gain of the controller is K. In addition, the manual control voltage $e_m$ will be supplied to one side of the capacitor $C_2$ while the controller output voltage $e_0$ will be applied to the other side thereof. Thus, the charge $e_{c_2}$ across the capacitor $C_2$ during manual operation may be expressed by the following equation:

$$e_{c_2}=e_m-e_0 \tag{7}$$

or $$e_{c_2}=e_m+Ke_{in} \tag{8}$$

When a transfer back to automatic operation is subsequently made as described in connection with FIG. 1, the contacts $D_{17}$ open and contacts $D_{16}$ will close to reconnect the capacitor $C_2$ in series with the resistor $R_2$ to establish reset operation of the controller 110. At the instant of actuation of contacts $D_{17}$ and $D_{16}$ the output voltage $e_0$ will be equal to $Ke_{in}$ plus the voltage or charge $e_{c_2}$ across the capacitor $C_2$ as expressed by the following equation:

$$e_0=-Ke_{in}+e_{c_2} \tag{9}$$

Through substitution of the value of $e_{c_2}$ as given by Equation 8, the following equations result:

$$e_0=-Ke_{in}+(e_m+Ke_{in}) \tag{10}$$

and $$e_0=e_m \tag{11}$$

Thus, from the above it will be apparent that the controller 110 output voltage $e_0$ at the instant of transfer from manual to automatic operation is equal to the manual control voltage $e_m$. This condition is established by capacitor $C_2$ and its associated circuitry.

After a transfer from manual to automatic operation is made the capacitor $C_2$ will slowly cause the controller 110 to integrate until normal automatic control action is obtained. Thus, after a short interval of time normal reset operation of the controller 110 will occur.

It will now be apparent that the embodiment disclosed in FIG. 3 operates in a manner similar to that disclosed in FIG. 1. During automatic operation continuous followup positioning of the contact arm 54 is accomplished so that at the instant of transfer from automatic to manual operation the output of controller 110 will equal the voltage of contact arm 54 or the manual control voltage. As a result a bumpless transfer from automatic to manual operation may be made at any instant by the operator merely by actuating switch 90 as previously described. During manual operation the controller 110 is converted from a reset controller to a proportional controller and the capacitor $C_2$ is utilized to equalize the controller 110 output with the manual control voltage at the instant of transfer back to automatic operation.

The use of the capacitor $C_2$ as a means of equalizing the manual controller and automatic controller output voltages in the embodiment of FIG. 3 has a decided advantage in that only a very limited number of additional parts are required over those normally employed in a control system having a reset controller.

Figure 4:
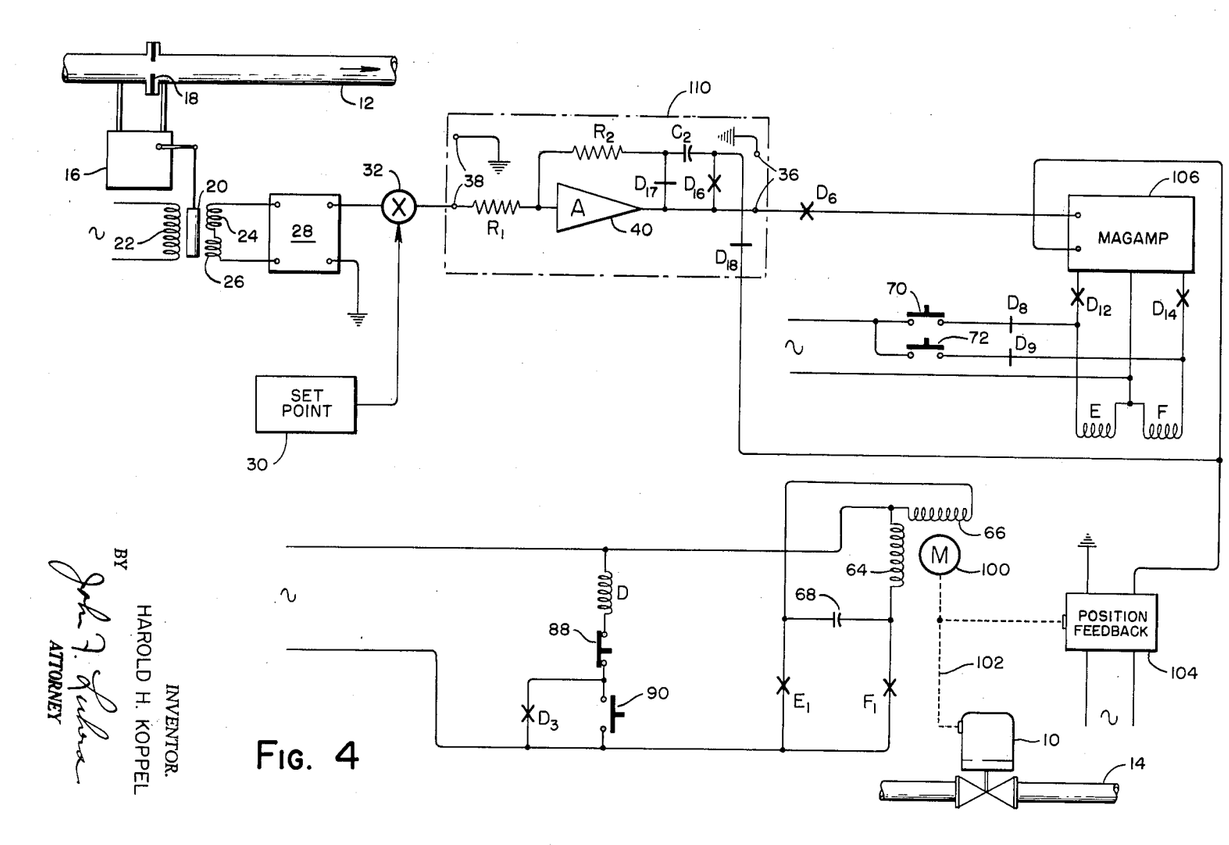

*FIG. 4 Embodiment*

FIG. 4 of the drawings illustrates the application of the reset controller 110 and transfer means illustrated in FIG. 3 to the electric positioning system illustrated in FIG. 2. In this embodiment the contacts $D_6$ are employed to connect the controller 110 to the magnetic amplifier 106 while the contacts $D_{18}$ are utilized to connect one side of the reset capacitor to the output terminal of the position feedback transmitter 104.

The operation of the embodiment of FIG. 4 is generally similar to that disclosed in FIG. 3 except that the voltage applied to the capacitor $C_2$ by contacts $D_{18}$ during manual operation is generated by the position feedback transmitter 104 which as discussed in connection with FIG. 2 is generally equivalent to the potentiometer circuit 50 in function. Thus, similar to the FIG. 3 embodiment the reset capacitor $C_2$ serves two functions that of providing reset action during automatic operation and establishing equalization of the manual and automatic control voltages prior to a transfer of manual to automatic operation. As described in connection with FIG. 2 the motor is merely deenergized upon a transfer from automatic to manual operation and, therefore, an equalization of these two voltages is not necessary when transferring in that direction.

Figure 5:
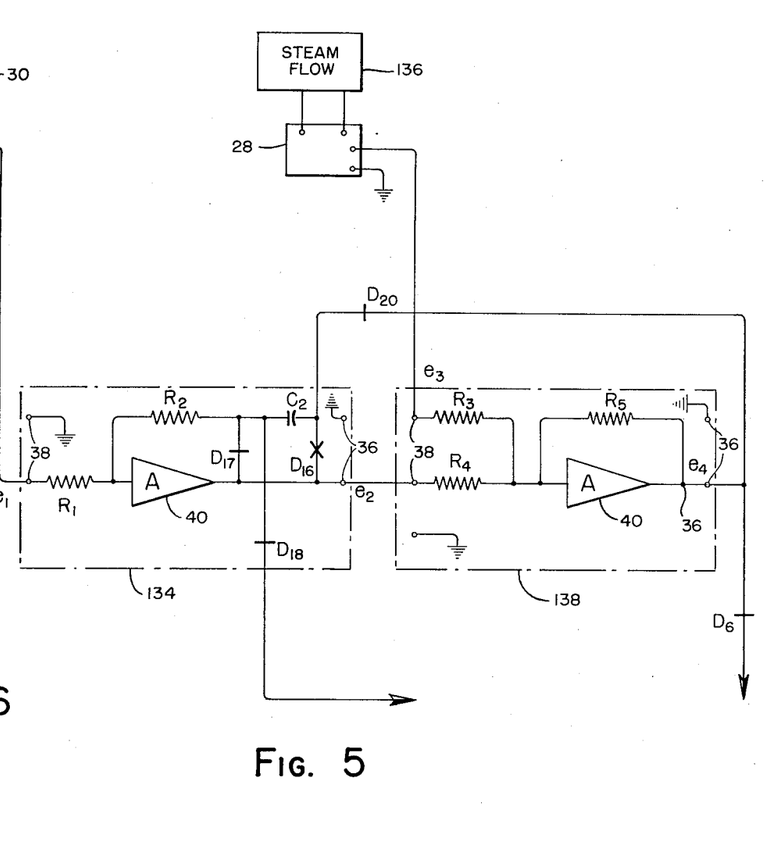

FIG. 5 Embodiment

Figure 6:
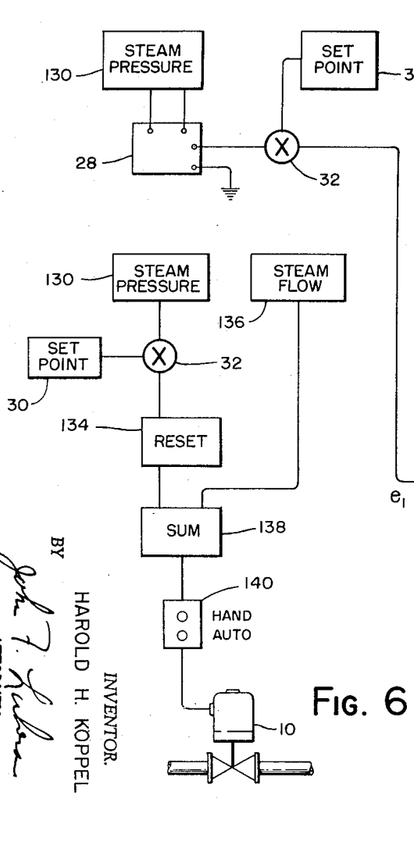
FIG. 6 is a block diagram of the system illustrated in FIG. 5.

The applications of the invention disclosed in FIGS. 1–4 of the drawings utilize single element control systems. In FIG. 5 of the drawings there is shown an application of the invention to a 2-element control system wherein the position of a final control element is controlled in accordance with the variations in two different variables. In FIG. 6 there is shown a block diagram of such a control system. More particularly, a steam pressure transmitter 130 establishes an electric signal which is compared with a set point signal at 32 to establish an error signal representative of the departure of a steam pressure condition from set point. This signal is provided with reset characteristics in a controller or control action unit 134 of the type shown in FIGS. 3 and 4 and disclosed in detail in copending application Serial No. 805,019.

The output signal of the control action unit of controller 134 is compared with a signal representative of the steam flow established by a transmitter 136 in a summing control action unit 138 which may also be of the type disclosed in copending application Serial No. 805,019. The output of control action unit 138 is taken through a selector station 140 which as now will be described is also provided with means for effecting bumpless transfer between manual and automatic operation.

Referring now to FIG. 5, the controller 134 is of the proportional plus reset type illustrated in FIGS. 3 and 4 comprising an amplifier 40, resistors $R_1$ and $R_2$, and reset capacitor $C_2$. The control action unit or controller 138 as described in copending application Serial No. 805,019 comprises an amplifier 40 having a pair of input resistors $R_3$ and $R_4$, a feedback resistor $R_5$ and input terminals 38 which are adapted to be connected respectively as shown to the outputs of controller 134 and transmitter 136. The controller 134 is effective to produce a voltage drop across resistor $R_4$ equal to its output voltage and the transmitter 136 is similarly effective to produce a voltage drop across resistor $R_3$. With this arrangement the output of controller 138 at its terminal 36 will be proportional to the sum of the outputs of controller 134 and transmitter 136, the relative effectiveness of the two signals being dependent on the relative values of the resistors $R_3$ and $R_4$ of controller 138.

It will be apparent that with the 2-element control system at the instant of transfer from automatic to manual operation or vice versa the output of the summing control action unit 138 must equal the manual control voltage. To accomplish this the contacts $D_{18}$ are effective to apply the voltage of contact arm 54 or output of valve position transmitter 104, depending on whether an electric or pneumatically actuated valve is utilized, to the left side of the capacitor $C_2$. Contacts $D_{20}$ serve to connect the output terminal of controller 138 to the right side of the capacitor $C_2$ during manual operation. The contacts $D_{16}$ and $D_{17}$ serve to transform the controller 134 into a proportional controller during manual operation as described in connection with FIGS. 3 and 4.

In operation of the embodiment illustrated in FIG. 5, when the system is on automatic operation continuous follow-up movement of the contact arm 54 will occur when the positioning system disclosed in FIGS. 1 and 3 is utilized. Thus, the manual control voltage will equal the output of controller 138. When a positioning system of the type disclosed in FIGS. 2 and 4 is utilized transfer is accomplished by deenergizing the motor 100, and the problem of bumpless transfer to manual operation does not exist.

When a transfer from automatic to manual operation is made, the unit 134 is converted from a reset unit to a proportional unit by contacts $D_{16}$ and $D_{17}$. Contacts $D_{18}$ apply the manual control voltage $e_m$ to one side of the capacitor $C_2$ and contacts $D_{20}$ apply the output voltage of controller 138 to the other side of the capacitor $C_2$. Thus, the voltage $e_{c_2}$ across the capacitor $C_2$ may be expressed as follows where $e_4$ is the output voltage of controller 138:

$$e_{c_2} = -e_m + e_4 \qquad (12)$$

The output voltage $e_4$ may be expressed by the following equation where, $e_3$ is the output voltage of transmitter 136, $e_2$ is the output voltage of controller 134, and $R_1$, $R_2$, $R_3$, $R_4$ and $R_5$ are the values of the resistance elements.

$$e_4 = \frac{-R_5}{R_4}e_2 - \frac{R_5}{R_3}e_3 \qquad (13)$$

The output voltage $e_2$ of controller 134 may be expressed as follows in terms of the input voltage $e_1$ thereto:

$$e_2 = \frac{-R_2}{R_1}e_1 \qquad (14)$$

Through substitution of Equation 14 in Equation 13 the following results:

$$e_4 = \frac{R_2}{R_1}\frac{R_5}{R_4}e_1 - \frac{R_5}{R_3}e_3 \qquad (15)$$

The last equation may be combined with Equation 12 to produce the following expression for $e_{c_2}$:

$$e_{c_2} = -e_m - e_3\frac{R_5}{R_3} + e_1\frac{R_5}{R_4}\frac{R_2}{R_1} \qquad (16)$$

Upon transfer from manual to automatic equation the contacts $D_{16}$ and $D_{17}$ are effective to connect the capacitor $C_2$ into the feed back circuit of unit 134. Thus, the output voltage $e_2$ of unit 134 at this instant may be expressed as follows:

$$e_2 = \frac{-R_2}{R_1}e_1 + e_{c_2} \qquad (17)$$

Equation 16 may be substituted in Equation 17 to produce the following equation:

$$e_2 = -e_1\frac{R_2}{R_1} - e_3\frac{R_5}{R_3} + e_1\frac{R_5}{R_4}\frac{R_2}{R_1} - e_m \qquad (18)$$

Substituting the last equation in Equation 13 for $e_2$ the following results:

$$e_4 = \frac{R_5}{R_4}\left(e_1\frac{R_2}{R_1} + e_3\frac{R_5}{R_3} - e_1\frac{R_5}{R_4}\frac{R_2}{R_1} + e_m\right) \qquad (19)$$

If $R_5$ is made equal to $R_4$ the last equation reduces to $$e_4 = -e_3\frac{R_5}{R_3} + e_1\frac{R_2}{R_1} + \frac{R_5}{R_3}e_3 - e_1\frac{R_2}{R_1} + e_m \qquad (20)$$

or $$e_4 = e_m \qquad (21)$$

Thus, at the instant of transfer the output voltage $e_4$ will equal the manual control voltage and a transfer may be safely made.

While several embodiments have been herein shown and described, it will be apparent to those skilled in the art that many changes may be made in the construction and arrangement of the parts without departing from the scope of the invention as defined in the appended claims.

This application is a continuation of my application, Serial No. 841,171, filed Sept. 21, 1959.

What I claim as new and desire to secure by Letters Patent of the United States, is:

1. In a control system, the combination comprising, a final control element, first electrically operative means for controlling the position of said control element, second electrically operative means for controlling the position of said control element, an electric relay having contact means effective in one position of said relay to connect said first electrically operative means to said control element and in another position of said relay to connect said second electrically operative means to said control element, circuit means including an electric capacitor associated with said first and second electrically operative means, means including said relay for charging said capacitor in proportion to the voltage difference of the outputs of said first and second electrically operative means during control of said control element from one of said electrically operative means and for connecting said capacitor so charged to equalize the outputs of said first and second electrically operative means at the instant of transfer of control from said one of said electrically operative means to the other of said electrically operative means.

2. In a control system, the combination comprising, a final control element, means responsive to variations in the magnitude of a variable for establishing a first electrical signal having a predetermined range and representative of the magnitude of the variable, an electric controller for amplifying said signal and having a feedback circuit, an electric capacitor connected in said feedback circuit for introducing reset characteristics into said first signal, separate means for manually establishing a second electrical signal variable in said range, relay means operative when energized to effect control of said control element from said controller and when deenergized to effect control of said control element from said manual means, and first contact means associated with relay means effective to apply the output signals of said controller and said manual means to opposite sides of said capacitor respectively in the deenergized condition of said relay means to thereby equalize said output signals at the instant of subsequent energization of said relay means.

3. In a control system as claimed in claim 2 wherein said manually operative means comprises a potentiometer circuit having a movable contact arm for varying said second signal.

4. In a control system as claimed in claim 3 further including a servo amplifier responsive to the difference between said first and second signals, an electric motor connected to the output of said amplifier for positioning said contact arm to maintain said signals equal, and second contact means associated with said relay means effective to render said motor operative in response to said amplifier output in the energized condition of said relay means and inoperative in the deenergized condition of said relay means.

5. In a control system as claimed in claim 4 wherein manually operative switch means are provided for effecting energization of said motor in said deenergized condition of said relay means to effect manual positioning of said contact arm and said control element.

6. In a control system, the combination comprising, a control element, means responsive to variations in a variable for establishing an electrical signal in a predetermined range representative of the magnitude of the variable, an electric controller for amplifying said signal and having an electric amplifier provided with a feedback circuit, an electric capacitor connected in said feedback circuit for introducing reset characteristics into said signal, circuit means including a device responsive to the output of said controller for operating said control element, relay means associated with said circuit means and having one position for rendering said operating device operative in response to said controller output signal and a second position for rendering said operating device inoperative in response to said controller output signal, manually operative switch means operative in said second position of said relay means for energizing said operating device to effect manual operation of said control element, and contact means associated with said relay means for disconnecting said reset capacitor from said feedback circuit in said second position of said relay means.

7. In a control system as claimed in claim 6 further including a transmitting device for establishing an electrical signal representative of the position of said control element and further including second contact means for connecting the outputs of said transmitting device and said controller to opposite sides of said capacitor respectively in said second position of said relay means.

8. In a control system, the combination comprising a final control element, first means responsive to the magnitude of a first variable for establishing a first electrical signal, second means responsive to the magnitude of a second variable for establishing a second electrical signal, a first electric controller for amplifying said first signal, said controller comprising an amplifier having an external feedback circuit, a capacitor connected in said feedback circuit for introducing reset characteristics into the output signal of said first controller, a second controller for producing an output signal proportional to the algebraic sum of said first controller output signal and said second signal, manually operative means for controlling the position of said control element, relay means having a first position for applying the output of said second controller to said control element and a second position for effecting control of said control element from said manually operative means, first contact means associated with said relay means having one position for connecting said capacitor in said feedback circuit to produce said reset action and a second position for disconnecting said capacitor from said feedback circuit, a transmitting device for establishing an electrical signal representative of the position of said control element in said second position of said relay means, and second contact means associated with said relay means effective to connect the outputs of said second controller and said transmitting device to opposite sides of said capacitor in said second position of said first contact means.

9. In a control system, the combination comprising regulating means of a condition responsive to a first or a second electric control signal, a first controller for producing the first control signal comprising an operational amplifier, a first input impedance connected to the input of said amplifier, a feedback circuit for said amplifier comprising a resistance connected between the input and output thereof for causing the first control signal to be proportional to a first input signal applied to said first input impedance, a second controller for establishing the second control signal, switch means having a first position for connecting the output of said first controller to said regulating means to effect adjustment thereof in accordance with changes in the first control signal and a second position for connecting said second controller to said regulating means to effect adjustment thereof in accordance with changes in the second control signal, a capacitor, a second input impedance connected to the input of said amplifier comprising a resistance equal in value to said feedback resistance, a circuit established by said switch means in said second position which connects one side of said capacitor to the output of said first controller and the other side of the output of said second controller, and a circuit established by said switch means in said first position which connects said one side of said capacitor to said second input impedance and said other side of said capacitor to ground to thereby apply a second input signal to said amplifier at the instant of transfer from said second to said first controller to cause said first control signal momentarily to equal said second control signal at the instant of transfer and thereafter to gradually adjust to proportionality with said first input signal as said capacitor discharges and said second input signal attenuates to zero.

10. In a control system, the combination comprising, regulating means of a condition responsive to an electric control signal, a controller producing said control signal comprising an operational amplifier, a first input impedance connected to the input of said amplifier, a feedback circuit for said amplifier comprising a resistance connected between the input and output thereof for causing said control signal to be proportional to a first signal applied to said first input impedance, switch means having a first position for connecting the output of said controller to said regulating means and a second position disconnecting said controller from said regulating means, a capacitor, a second input impedance connected to the input of said amplifier comprising a resistance equal in value to said feedback resistance, means producing a signal corresponding to the status of said regulating means, a circuit established by said switch means in said second position thereof which connects one side of said capacitor to the output of said controller and the other side to said status signal, and a circuit established by said switch means in said first position thereof for connecting said one side of said capacitor to said second input impedance and said other side of said capacitor to ground to thereby apply a second input signal to said amplifier at the instant of connection of said controller to said regulating means to thereby cause said control signal momentarily to equal said status signal at the instant of connection and thereafter to gradually adjust to proportionality with said first input signal as said capacitor discharges and said second input signal attenuates to zero.

11. In a control system, the combination comprising regulating means of a condition responsive to a first or a second electric control signal, a first controller for producing said first control signal comprising an operational amplifier, an input impedance connected to the input of said amplifier, a feedback circuit for said amplifier comprising a capacitor connected between the input and output thereof for causing the first control signal to vary as the time integral of an electric input signal applied to said input impedance, a second controller for establishing said second control signal, switch means having a first position establishing said feedback circuit connections of said capacitor and for connecting the output of said first controller to said regulating means to effect adjustment thereof in accordance with said first control signal, and a second position for connecting said second controller to said regulating means to effect adjustment thereof in accordance with said second control signal, said switch means being operative in said second position to effect connection of the side of said capacitor connected to the output of said amplifier in said first position to the output of said second controller and the other side of said capacitor to the output of said amplifier so that upon return of said switch means to said first position said first control signal momentarily equals said second control signal at the instant of transfer and thereafter gradually adjust to proportionality with the time integral of said input signal.

12. In a control system as claimed in claim 18 wherein said first controller comprises a proportional plus integral operational amplifier having a feedback resistance connected in series with said capacitor to establish a first control signal at the output of said amplifier having proportional plus integral characteristics, said switch means being effective to disconnect said capacitor from said feedback circuit in said second position thereby causing the output of said amplifier to vary linearly in proportion to changes in the input signal only.

13. In a control system, the combination comprising, regulating means of a condition responsive to a first or a second control signal, means responsive to variations in the magnitude of a variable for establishing a signal proportional to the magnitude of the variable, an electric controller for amplifying said signal to produce said first control signal, means for establishing said second control signal, electrically operative adjusting means for said last named means, switch means having a first position for applying said first control signal to control said regulating means and a second position for applying said second control signal to control said regulating means, an electric capacitor, a circuit established by said switch means in said second position thereof effective to charge said capacitor in proportion to the difference between said first and second control signals, a circuit established by said switch means in said first position thereof effective to connect said capacitor so charged in the circuit of said first controller to equalize the first and second control signals at the instant of actuation of said switch means from said said second to said first position to permit a shockless transfer of control from said second control signal to said first control signal, and means responsive to said first control signal in said first position of said switch means for actuating said electrically operative adjusting means to continuously equalize said second control signal with said first control signal to permit a shockless transfer of control from said first control signal to said second control signal upon actuation of said switch means from said first position to said second position.

14. In a control system, the combination comprising, a final control element, electrically operative positioning means for said control element, manually operative switch means for controlling energization of said positioning means to permit manual operation of said control element means for establishing a voltage signal representative of the control element position, means responsive to variations in the magnitude of a variable for establishing a voltage signal representative of the magnitude of the variable, an automatic controller comprising an operational amplifier having a passive input impedance and a passive feedback impedance responsive to said variable representative voltage signal, said controller being operative to establish an automatic control voltage signal having a predetermined functional relationship with said variable representative voltage signal, transfer switch means having a first position for connecting said automatic controller to said positioning means to effect automatic positioning of said control element in accordance with said automatic control signal and a second position for disconnecting said controller from said positioning means, a circuit established by said transfer switch means in said first position thereof for rendering said manually operative switch means inoperative, a circuit established in said second position of said transfer switch means for rendering said manually operative switch means operative, an electric capacitor, a circuit established in said second position of said transfer switch means effective to charge said capacitor in proportion to the voltage difference of the outputs of said automatic controller and said control element position responsive means, and a circuit established by said transfer switch means in said first position thereof effective to connect said capacitor so charged in the circuit of said controller to thereby equalize the output of said controller with the output of said position responsive means upon actuation of said transfer switch means from said second to said first position.

15. In a control system as claimed in claim 14 wherein said controller comprises a proportional action controller, said input and feedback impedances comprising resistances which form a summing junction at the input to said amplifier, the last said circuit connecting said charged capacitor in series with a resistance between said summing junction and ground.

16. In a control system as claimed in claim 14 wherein said controller comprises a proportional plus integral controller, said input impedance comprising a resistance and said feedback impedance comprising a resistance connected in series with said capacitor in said first position of said transfer switch means, said charging circuit disconnecting said capacitor from said feedback circuit in said second position of said transfer switch means.

17. In a control system, the combination comprising, a final control element, positioning means for said control element responsive to an electrical control signal, means responsive to variations in the magnitude of a variable for establishing an electric signal representative of the variable, an automatic controller having proportional plus integral action for producing an automatic control voltage signal, said controller comprising an operational amplifier having a passive input resistance and a passive feedback circuit including an electric capacitor for introducing said integral action, a manually adjustable controller for establishing a manual control voltage signal, switch means having a first position for connecting said automatic controller to said positioning means to effect automatic positioning of said control element in accordance with said automatic control signal and a second position for connecting said manual controller to said positioning means to effect manual positioning of said control element in accordance with said manual control signal, and a circuit established by said switch means in said second position thereof effective to disconnect said capacitor from said feedback circuit to terminate integrating operation of said automatic controller during control of said control element from said manually adjustable controller.

18. In a process control system, the combination comprising, a final control element, operating means for said control element, means responsive to variations in the magnitude of a process variable for establishing an electric signal representative of the variable, an automatic controller responsive to said variable representative signal for establishing an automatic control signal having a predetermined functional relationship to said variable representative signal, an adjustable controller for establishing a second variable control signal, transfer switch means for selectively connecting one of said controllers to said operating means, and means associated with each of said controllers responsive to the difference in magnitude of said second and automatic control signals for equalizing the output of its associated controller with the output of the other controller during transfer of control of said control element from said other controller to its said associated controller.

19. In a process control system, the combination comprising, a final control element, means responsive to an electric control signal for operating said control element, an automatic controller for producing an output control signal representative of the magnitude of a variable, said controller comprising an operational amplifier having an external passive impedance element for introducing a predetermined control characteristic into said automatic control signal, a manually adjustable controller having a manually adjustable output control signal, transfer switch means having a first position for connecting said automatic controller to said positioning means and a second position for connecting said manual controller to said positioning means, means including said impedance element responsive to the difference in magnitude of said automatic and manual control signals in said second position of said switch means for equalizing said automatic and manual control signals during transfer from manual to automatic control, and means responsive to the difference in magnitude of said automatic and manual control signals in said first position of said switch means for equalizing said automatic and manual control signals during transfer from automatic to manual control.

References Cited in the file of this patent

UNITED STATES PATENTS 2,734,155   Schuck ---------------- Feb. 7, 1956

UNITED STATES PATENT OFFICE
CERTIFICATE OF CORRECTION

Patent No. 3,068,387  December 11, 1962

Harold H. Koppel

It is hereby certified that error appears in the above numbered patent requiring correction and that the said Letters Patent should read as corrected below.

Column 5, line 71, for "Conacts" read -- Contacts --; column 10, lines 34 and 35, for the left-hand portion of equation 16, for "$e_{c_2} = -e_m - e$" read -- $e_{c_2} = -e_m - e_3$ --; lines 52 and 53, the left-hand portion of equation 19, for "$e^4$" read -- $e_4$ --; column 13, line 55, for the claim reference numeral "18" read -- 11 --; column 14, line 24, after "element" insert a comma.

Signed and sealed this 3rd day of September 1963.

(SEAL)
Attest:

ERNEST W. SWIDER
Attesting Officer

DAVID L. LADD
Commissioner of Patents